US005797827A

United States Patent [19]

Sondergeld

[11] Patent Number: 5,797,827

[45] Date of Patent: Aug. 25, 1998

[54] PRINTING MATERIAL GUIDING SURFACE STRUCTURE FOR PRINTING MACHINE CYLINDERS

[75] Inventor: Werner Sondergeld, Offenbach, Germany

[73] Assignee: MAN Roland Druckmaschinen AG, Germany

[21] Appl. No.: 637,166

[22] Filed: Apr. 24, 1996

[30] Foreign Application Priority Data

Apr. 26, 1995 [DE] Germany ........................ 195 15 393.6

[51] Int. Cl.$^{6}$ ........................ B23P 15/00

[52] U.S. Cl. ........................ 492/37; 492/30

[58] Field of Search ........................ 492/37, 33, 35, 492/36, 30, 28

[56] References Cited

U.S. PATENT DOCUMENTS

| | | | |
|---|---|---|---|
| 2,662,002 | 12/1953 | Sunderhauf et al. | 492/30 |
| 4,291,438 | 9/1981 | Seiki et al. | 492/30 |
| 4,841,611 | 6/1989 | Kusaba et al. | 492/30 |
| 4,960,050 | 10/1990 | Hatch | 492/30 |
| 5,093,180 | 3/1992 | Morgan | 492/30 |
| 5,191,703 | 3/1993 | John | 29/895.32 |
| 5,207,158 | 5/1993 | Fadner et al. | 492/30 |
| 5,234,040 | 8/1993 | Koba | 492/30 |
| 5,402,705 | 4/1995 | Kildune | 492/30 |

FOREIGN PATENT DOCUMENTS

| | | |
|---|---|---|
| PS 136 481 | 7/1979 | Germany . |
| 29 16 505 A1 | 10/1980 | Germany . |
| 24 46 188 C3 | 11/1983 | Germany . |
| 42 07 119 A1 | 9/1993 | Germany . |

*Primary Examiner*—Irene Cuda

*Attorney, Agent, or Firm*—Leydig, Voit & Mayer, LTD.

[57] ABSTRACT

A printing material guiding surface structure, preferably for cylinders or cylinder dressings of printing machines has a surface structure which facilitates improved sheet guiding in that the friction forces at the contact points of the printing material and the surface structure are increased. This is achieved by utilizing elevated structure elements which are arranged on a substrate, and which have a bearing surface with a multiplicity of depressions that increase the surface roughness thereof and have good ink repelling characteristics.

16 Claims, 2 Drawing Sheets

PRINTING MATERIAL GUIDING SURFACE STRUCTURE FOR PRINTING MACHINE CYLINDERS

BACKGROUND OF THE INVENTION

1. Field of the Invention

The present invention relates to a printing material guiding surface structure for cylinders or cylinder dressings of printing machines. The surface structure is particularly suitable on a back pressure cylinder of a sheet-fed offset rotary printing machine configured for perfecting, i.e., double sided printing.

2. Discussion of the Related Art

In sheet-fed offset rotary printing machines there is a need for guiding the printing material through the machine during the printing process. The guiding is generally accomplished utilizing a surface structure mounted to at least one of the rotating cylinders of the printing machine. For example, a surface comprising convex and concave elevations and depressions distributed in a statistically even irregular manner on a dressing in a printing machine is disclosed in DE 2 446 188 C3. The spherical structure elements are formed in such a way that the printing material, e.g., a sheet, is supported on the bearing surfaces formed by poles. A surface structure for a sheet guiding foil as a dressing for back pressure cylinders in printing machines is disclosed in DE 2 916 505 A1. The surface structure in this reference has spheres as a substrate layer and which has a covering layer (coating) of chromium, nickel or nickel chromium steel.

DE 4 207 119 A1 discloses a sheet guiding surface structure, preferably for an impression cylinder of a printing machine, having cylindrical elevations. The cylindrical elevations, which are made of chromium, are arranged perpendicular to the outer surface of the cylinder and with their covering layers plane-parallel to the cylinder axis.

In the above described references, the surface structures comprise relatively smooth surfaces. Smooth surfaces are generally desirable since they tend to repel ink. This is particularly advantageous in printing machines configured for perfecting or double sided printing because if a particular surface attracts ink when a sheet is turned, then the next sheet to come into contact with the surface may remove the ink from the surface thereby smudging or otherwise distorting the printed image. However, while smooth surfaces tend to have good ink repelling properties, depending on the geometrical formation of the structure, there may be relative movement between the printing material and the surface structure on the cylinder of the printing machine. The relative movement may cause a ghosting effect, i.e., double or blurred images, especially when the particular cylinder is downstream of the turning device in the sheet running direction.

SUMMARY OF THE INVENTION

In accordance with one aspect, the present invention is directed to a surface structure for cylinders or cylinder dressings of printing machines. The surface structure comprises a multiplicity of elevated elements separated by valleys formed on a substrate surface of the cylinders or cylinder dressings in a statistically uniform distribution. The multiplicity of elevated elements having bearing surfaces for supporting and guiding printing materials in contact with the cylinders or cylinder dressings. The bearing surfaces comprising a multiplicity of depressions for providing a rough surface that prevents slippage of the printing materials on the cylinders.

The object of the present invention is to develop a printing material guiding surface structure for printing machine cylinders which provides appreciably improved sheet guiding in that the friction forces at the contact points of the printing material and the surface structure are increased in order to appreciably reduce the ghosting phenomena while limiting the transfer of ink from the sheet to the cylinder.

Improved adhesive friction at the point of contact between the printing material and the bearing surfaces of the surface structure is achieved by the surface structure of the present invention. An increase in quality is thus achieved, in particular in perfecting, since ghosting phenomena may be appreciably reduced. Moreover, the surface structure favors ink repelling characteristics.

These advantages are made possible by bearing surfaces which are arranged in a furrowed or cleft manner and permit higher friction forces between the printing material and the surface structure. At the same time, the percentage of the bearing surfaces bearing the printing material is reduced so that the possible contact surface of the printing material with the surface structure is reduced. In this case, the surface structure can have structure elements formed in the manner of a sphere, a cylinder, a truncated cone or a truncated pyramid, linking of the structure elements also being possible.

Departing from the previous opinion that the surface of the structure elements which is as smooth as possible in conjunction with the corresponding geometric shape favors ink separation upon contact and detachment of the sheet from such a surface structure, it has been found that the bearing surfaces of the structure elements of the present invention having an intentionally roughened surface results in an improvement in ink separation. As is customary in smooth surfaces, the ink guiding bearing surfaces of the structure elements do not form a uniform surface, but, due to the roughened surface, a bearing surface structured in this way has a multiplicity of small surfaces. These many small surfaces reduce the adhesion force of the ink so that the separation of the ink is not fed back from one point (starting from a smooth surface of a bearing surface) but from a multiplicity of small points.

BRIEF DESCRIPTION OF THE DRAWINGS

Exemplary embodiments of the printing material guiding surface structure in accordance with the present invention is described below with reference to the accompanying drawings in which.

DETAILED DESCRIPTION OF THE PREFERRED EMBODIMENTS

The present invention is directed to a printing material guiding surface structure for the cylinders or the dressings of cylinders, i.e., special surface or covering, of printing machines. The printing material guiding surface structure facilitates double sided printing and enhances the quality of the printed product by providing a surface that functions to hold the printing material securely in position during the printing process and one which has good ink repelling characteristics. This may be accomplished by providing a printing material guiding surface structure that includes bearing surfaces which are arranged in a furrowed or cleft manner and permit higher friction forces between the printing material and the surface structure. The bearing surfaces are configured as a multiplicity of smaller surfaces which reduce the adhesion force of ink in contact with the surface. The printing material guiding surface structure may be particularly well suited for use on back pressure cylinders of sheet-fed offset rotary printing machines configured for double sided printing.

Figure 1:
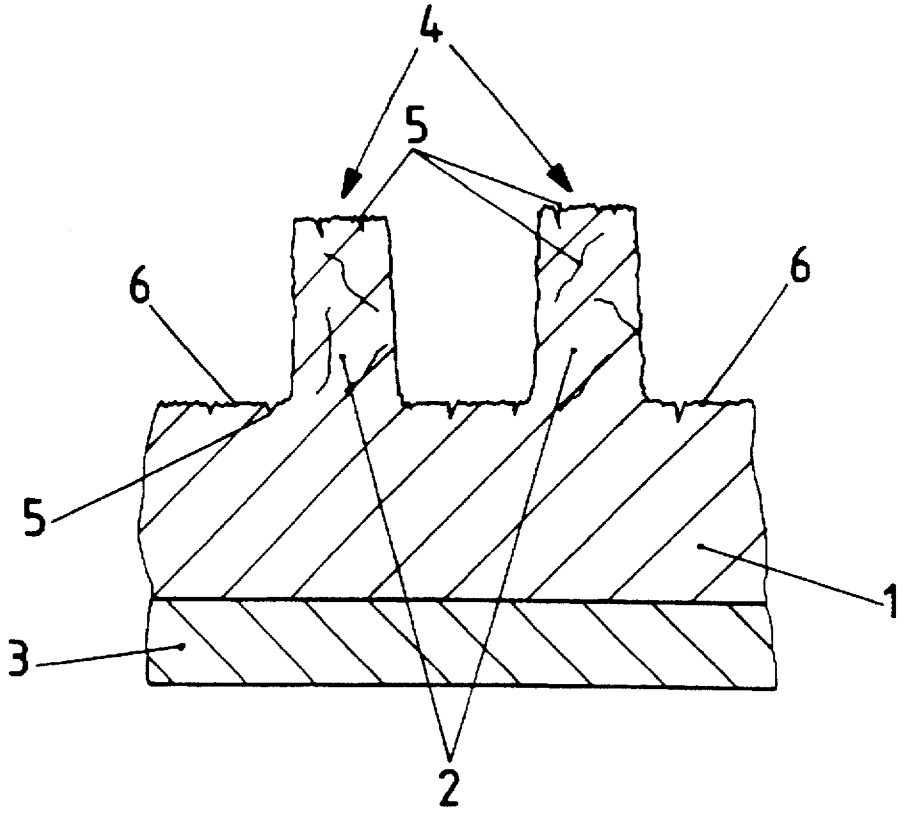
FIG. 1 illustrates an enlarged cross-sectional view of a surface structure of the present invention with cylindrical structure elements.
Figure 2:
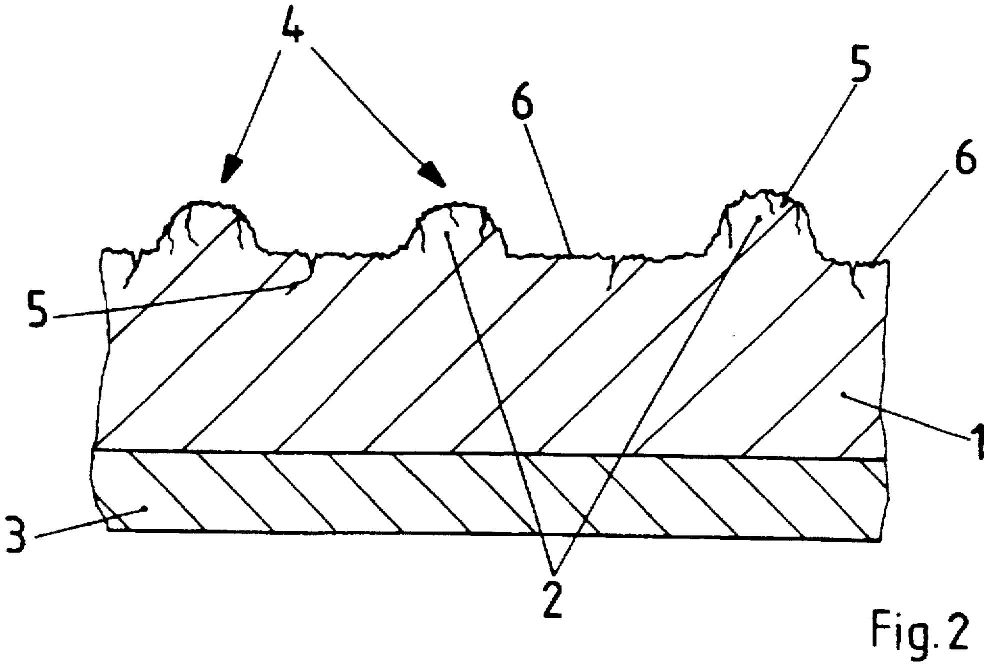
FIG. 2 illustrates an enlarged cross-sectional view of a surface structure of the present invention with spherical structure elements.
Figure 3:
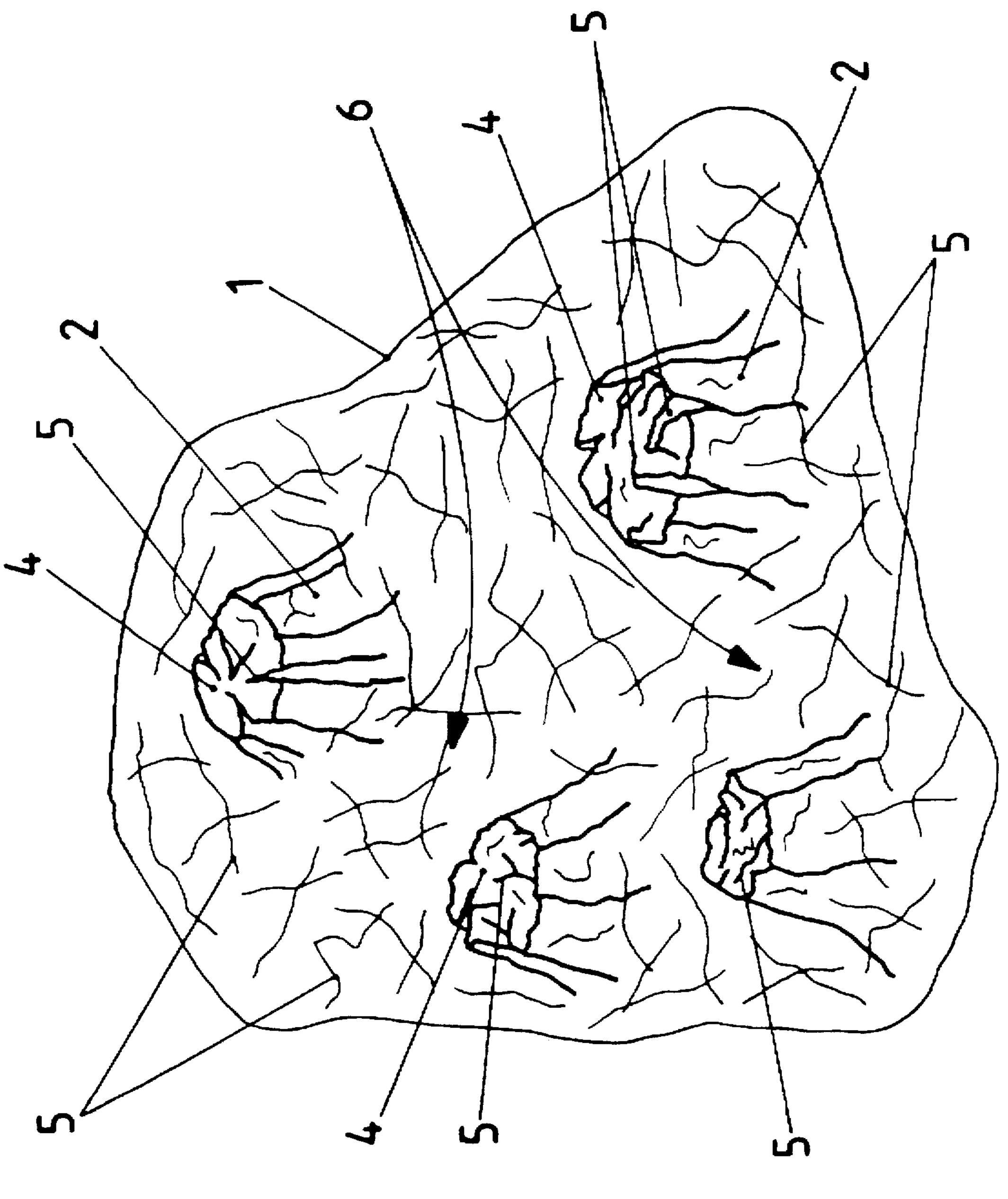
FIG. 3 illustrates an enlarged view of a surface structure of the present invention with structure elements in the shape of a truncated cone.

FIG. 1 illustrates an exemplary printing material-guiding surface structure 10 arranged on the circumference of a back pressure cylinder of a sheet-fed offset printing machine (not illustrated). Arranged upstream of the back pressure cylinder in the sheet running direction is a turning device (not illustrated) which transfers the sheet to the back pressure cylinder by the principle of turning the trailing edge. Turning devices which are typically utilized in sheet-fed offset rotary printing machines configured for double sided printing are known in the art. The surface structure 10 comprises a hard chromium layer 1 which is applied to a substrate 3. In the exemplary embodiment, the substrate 3 is the outer surface of the back pressure cylinder. As stated above, the printing material guiding surface structure 10 may be utilized on an outer surface of a different cylinder of a printing machine or a dressing for such a cylinder. The hard chromium layer 1 has, for example, a thickness of 150 μm. The hard chromium layer 1 of the surface structure 10 is configured into a formation of statistically approximately evenly distributed elevated structure elements 2 and corresponding structure valleys 6. The elevated structure elements 2 may comprise any suitable structure, for example, in the illustrated embodiment the elevated structure elements 2 are substantially cylindrically configured. Other suitable configurations include spherical as illustrated in FIG. 2, or in the shape of a truncated cone, as illustrated in FIG. 3. In addition, the elevated structure elements 2 can also be formed as a truncated pyramid.

The elevated structure elements 2 comprise bearing surfaces 4 which are in contact with the printed sheet (not illustrated). Essentially, the sheet is supported on these bearing surfaces 4 upon contact with the back pressure cylinder. These bearing surfaces 4 are arranged lying approximately at the same height. The hard chromium layer 1 also comprises a multiplicity of depressions 5 of varying depth arranged in an irregular manner in the bearing surfaces 4 of the elevated structure elements 2 as well as in the structure valleys 6. The depressions 5 in the elevated structure elements 2 are preferably deeper than the depressions 5 in the structure valleys 6. The depressions 5 are enlarged in a gap-like or furrow-like manner in the bearing surfaces 4. Any suitable technique may be utilized to enlarge the depressions 5, for example, by mechanical means or chemical means, e.g., etching. The elevated structure elements 2 have a roughness value or $R_z$ in the range from about 15 to about 35 μm. Accordingly, the depressions 5 are preferably deep enough in the hard chromium layer 1 to create a sufficient roughness, but not too deep as to cause a corrosion problem. Essentially, the depth of the depressions 5 is such that a sufficiently corrosion resistant chromium layer remains on the substrate 3.

During printing, the sheet transferred to the back pressure cylinder by the turning device comes with its printed side into contact with the surface structure 10, specifically the bearing surfaces 4. Once the sheet is in contact with the surface structure 10, the bearing surfaces 4 with their depressions 5 take over the function of sheet guiding. The multiplicity of individual surfaces which form a smaller bearing surface 4 compared to conventional designs discussed above reduce ink transfer. The ink is fed back in a punctiform, i.e., point, manner from the bearing surfaces 4 to the sheet or to following sheets. The surface structure 10 according to the present invention thus substantially improves the printing quality by reducing the ghosting phenomenon.

To further increase protection against wear, the elevated structure elements 2 can comprise an additional coating. This additional coating is preferably a hard PVD layer (PVD=Physical Vapor Deposition). For example, the PVD layer can consist of titanium nitride and have a layer thickness of 3 μm. The elevated structure elements 2 and the structure valleys 6 with depressions 5 are not influenced in their surface roughness by the protective layer.

Although shown and described are what is believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed is:

1. A surface structure for a sheet-guiding cylinder of a printing machine comprising a plurality of elevated elements separated by valleys and arranged in an approximately uniform distribution on the circumferential surface of the cylinder, each of the elevated elements having bearing surfaces for supporting and guiding printing material which contacts the cylinder, and a plurality of depressions formed in the bearing surfaces of the elevated elements for providing a rough surface that prevents slippage of the printing material on the cylinder.

2. The printing material guiding structure according to claim 1, wherein each of the valleys separating the elevated elements has an upper surface having a plurality of depressions formed therein.

3. The printing material guiding structure according to claim 2, wherein the depressions formed in the bearing surfaces and the depressions formed in the upper surface of the valleys comprise a network of irregular gaps, furrows, and cracks.

4. The printing material guiding structure according to claim 3, wherein the depressions formed in the bearing surfaces are greater in depth than the depressions formed in the upper surface of the valleys.

5. The printing material guiding structure according to claim 1, wherein each of the elevated elements has a substantially spherical configuration.

6. The printing material guiding structure according to claim 1, wherein each of the elevated elements has a substantially cylindrical configuration.

7. The printing material guiding structure according to claim 1, wherein each of the elevated elements has a truncated cone configuration.

8. The printing material guiding structure according to claim 1, wherein each of the elevated elements has a truncated pyramid configuration.

9. The printing material guiding structure according to claim 1, further comprising a protective coating covering the elevated elements and the valleys separating the elevated elements.

10. The printing material guiding structure according to claim 9, wherein the protective coating comprises a physical vapor deposition layer of titanium nitride.

11. The printing material guiding structure according to claim 10, wherein the layer of titanium nitride is 3 μm thick.

12. The printing material guiding structure according to claim 1, wherein the elevated elements and the valleys separating the elevated elements are formed in a chromium layer having a thickness of 150 μm.

13. The printing material guiding structure according to claim 3, wherein the elevated elements are linked to one another.

14. The printing material guiding structure according to claim 5, wherein the elevated elements having a substantially spherical configuration have egg shaped upper regions.

15. The printing material guiding structure according to claim 1 wherein the surface structure is integral with the sheet-guiding cylinder.

16. The printing material guiding structure according to claim 1 wherein the surface structure comprises a covering which surrounds the circumferential surface of the sheet-guiding cylinder.

* * * * *